United States Patent
Benuzzi (10) Patent No.: US 7,971,511 B2
(45) Date of Patent: Jul. 5, 2011

(54) PANEL SAW MACHINE (75) Inventor: Piergiorgio Benuzzi, Bologna (IT)

(73) Assignee: Giben International S.p.A., Pianoro (IT)

( * ) Notice: Subject to any disclaimer, the term of this patent is extended or adjusted under 35 U.S.C. 154(b) by 375 days.

(21) Appl. No.: 11/667,023

(22) PCT Filed: Aug. 24, 2006

(86) PCT No.: PCT/IB2006/002418
§ 371 (c)(1),
(2), (4) Date: May 3, 2007

(87) PCT Pub. No.: WO2007/029085
PCT Pub. Date: Mar. 15, 2007

(65) Prior Publication Data
US 2008/0092708 A1  Apr. 24, 2008

(30) Foreign Application Priority Data
Sep. 9, 2005 (IT) .............................. BO2005A0552

(51) Int. Cl.
*B26D 7/06* (2006.01)

(52) U.S. Cl. .................................. 83/412; 83/409; 83/36

(58) Field of Classification Search .................... 83/350, 83/404.2, 35, 36, 733, 468.3, 435.12, 435.13, 83/435.14, 435.21, 151, 153, 109, 111, 119, 83/455, 412, 468.5, 409.1, 409; 269/79
See application file for complete search history.

(56) References Cited

U.S. PATENT DOCUMENTS

| 4,181,054 | A | * | 1/1980 | Striebig | 83/153 |
| 4,317,397 | A | * | 3/1982 | Ess | 83/35 |
| 4,392,401 | A | * | 7/1983 | Ess | 83/219 |
| 5,311,799 | A |   | 5/1994 | Mohr |  |
| 5,850,774 | A | * | 12/1998 | Naldi | 83/418 |
| 5,868,217 | A | * | 2/1999 | Hines | 182/37 |
| 6,005,914 | A | * | 12/1999 | Quinn et al. | 378/81 |
| 6,470,780 | B1 |   | 10/2002 | Benuzzi |  |
| 6,571,674 | B2 |   | 6/2003 | Benuzzi |  |
| 6,584,913 | B2 | * | 7/2003 | Cloud | 108/43 |

(Continued)

FOREIGN PATENT DOCUMENTS

DE  37 37 228   11/1986

(Continued)

OTHER PUBLICATIONS

International Search Report for International Application No. PCT/IB2006/002418, Nov. 29, 2006.

*Primary Examiner* — Kenneth E. Peterson
*Assistant Examiner* — Sean Michalski
(74) *Attorney, Agent, or Firm* — Fay Sharpe LLP (57) ABSTRACT

A panel saw machine comprises: a horizontal work table movable in a forward and backward direction; a clamping unit equipped with one or more gripping elements for retaining panels while they are being machined; a cutting unit that divides the panels into sub-panels along an axis transversal to the feed axis; a horizontal tray positioned above the horizontal work table for transporting the panels; means for holding the tray in conjunction with means for driving the tray and enabling the tray to perform a first movement along the feed axis in both directions and a rotational movement on the horizontal work table so as to vary the position of the tray and of the panels with respect to the cutting unit.

10 Claims, 4 Drawing Sheets

U.S. PATENT DOCUMENTS

| | | | |
|---|---|---|---|
| 2001/0009120 A1* | 7/2001 | Faircloth | 83/439 |
| 2002/0096091 A1* | 7/2002 | Cloud | 108/43 |
| 2003/0233919 A1* | 12/2003 | Yourkievitz et al. | 83/35 |
| 2005/0092157 A1 | 5/2005 | Benuzzi | |

FOREIGN PATENT DOCUMENTS

| | | |
|---|---|---|
| EP | 1 057 599 | 3/2000 |
| EP | 1 138 455 | 10/2001 |
| WO | WO 2005/042214 | 5/2005 |

\* cited by examiner

PANEL SAW MACHINE

TECHNICAL FIELD

This invention relates to a panel saw machine, especially for panels of wood or similar materials.

BACKGROUND ART

Panel saw machines of known type are used to cut a single panel or two or more panels both lengthways and crossways. The panels vary in size and are usually placed one over the other in normally large stacks whose dimensions depend on the size of the panels made by the basic panel forming machines.

Panel saw machines, in their minimum standard configurations with a single cutting line to which we shall refer in this specification (purely by way of example, without limiting the scope of the invention), basically comprise:

a horizontal work table to support the stacks of panels to be cut;

a unit for picking up the panels and feeding them, along an axis X (horizontal), towards the end of the table opposite the stack loading end;

a cutting device operative on the part of the panel stack at said end of the work table.

More specifically, the pickup unit comprises a beam equipped with a plurality of clamping elements, for example of the gripper type, located side by side in a direction Y at right angles to the direction of forward or backward feed. The clamping elements act on the rear edge of the panels to be cut and may transport and/or retain (that is, advance or retract) the panels in position while they are being cut and while they are moved backwards and forwards on the work table.

The cutting device (consisting of circular saws and scoring blades) is mounted on a carriage that moves in both directions along the axis Y transversal to the panel feed axis X so as to cut right through all the panels if these are stacked or through only one if a single panel is being processed.

Usually, after the panels have been fed to the cutting line, they are trimmed and then, when necessary, cut one or more times according to a predetermined pattern programmed on the machine.

After the feeding step, if the panels have to be cut first along a direction parallel to the feed direction corresponding to the axis X, the panel stack or the single panel has to be turned through a right angle so that it can be fed to the cutting device in a position appropriate for the programmed pattern.

To facilitate the work of the operators who have to turn the panels downstream of the cutting device, devices such as the one described in patent EP-1.057.599 (in the name of the same Applicant as this invention) have been devised. These devices basically comprise an element for holding down at least one panel being machined and means for turning the panel about the hold-down element.

More specifically, the hold-down element is located in the vicinity of the work table in such a way as to form a pivot in a preset area of the panel and the means for turning the panel about the pivot facilitate panel movement to change the position of the panel relative to the cutting device.

These turning devices, however, have a complex structure including numerous components such as pusher elements associated with the pickup units.

On account of their complexity, the cost of these devices and hence of the machines they are mounted on tend to be quite high.

In particular, when the panel turning means operate in combination with the pickup units, the latter have to be mobile at least transversely along the aforementioned beam, which means that additional components and technology are required, thus further increasing costs.

To overcome these problems, the Applicant developed a different solution for turning the panels (disclosed in patent application WO 2005/042214 by the same Applicant) where an element for holding down the panel or panels (consisting of two mobile plates) is positioned in the vicinity of an edge of the work table and acts on the panels in such a way as to form a pivot and an axis of rotation in a defined area of the panels. There are also power-driven rubber wheels allowing the panel to be rotated about the pivot. The wheels are built into the work table and are mobile between a rest position in which they are away from the panels and a working position in which they are in contact with the panels. This rotation is performed on a multi directional low-friction surface of the work table.

This solution, which is more practical and economical than the solution preceding it is not, however, free of disadvantages, due to the fact that:

in some cases, the panels being rotated may need to be accompanied by the operator (manually or using additional equipment), thus slowing down work and creating dangerous situations for the operator;

when working with panels having smooth, low-friction surfaces, the pivot plates cannot grip the panels firmly enough to keep the stack properly in place, especially at the start or end of a movement, that is to say, during the transition from one state to another.

The aim of this invention is to overcome these disadvantages by providing a panel saw machine that is at once practical and inexpensive and that combines high productivity and panel cutting precision with safe and easy panel rotating operations.

DISCLOSURE OF THE INVENTION

According to the invention, this aim is achieved by a panel saw machine comprising: a horizontal work table for one or more panels mobile on the horizontal table along an axis of feed in a forward direction and in a backward direction; a panel clamping unit comprising a crossbar equipped with one or more gripping elements for clamping and retaining the panels while they are being machined a cutting unit that divides the panels into sub-panels by sawing the panels along an axis transversal to the feed axis; a horizontal flat element or tray positioned above the horizontal work table, for supporting and transporting the panels; means for selectively holding the tray in conjunction with means for driving the tray itself, acting on the latter and enabling the tray to perform a first movement along the feed axis in both directions and, when required, a rotational movement on the horizontal work table in such a way as to vary the position of the tray and, consequently, of the panels, with respect to the cutting unit.

BRIEF DESCRIPTION OF THE DRAWINGS

The technical characteristics of the invention, with reference to the above aims, are clearly described in the claims below and its advantages are apparent from the detailed description which follows, with reference to the accompanying drawings which illustrate preferred embodiments of the invention provided merely by way of example without restricting the scope of the inventive concept, and in which:

DETAILED DESCRIPTION OF THE PREFERRED EMBODIMENTS OF THE INVENTION

Figures 1, 7:
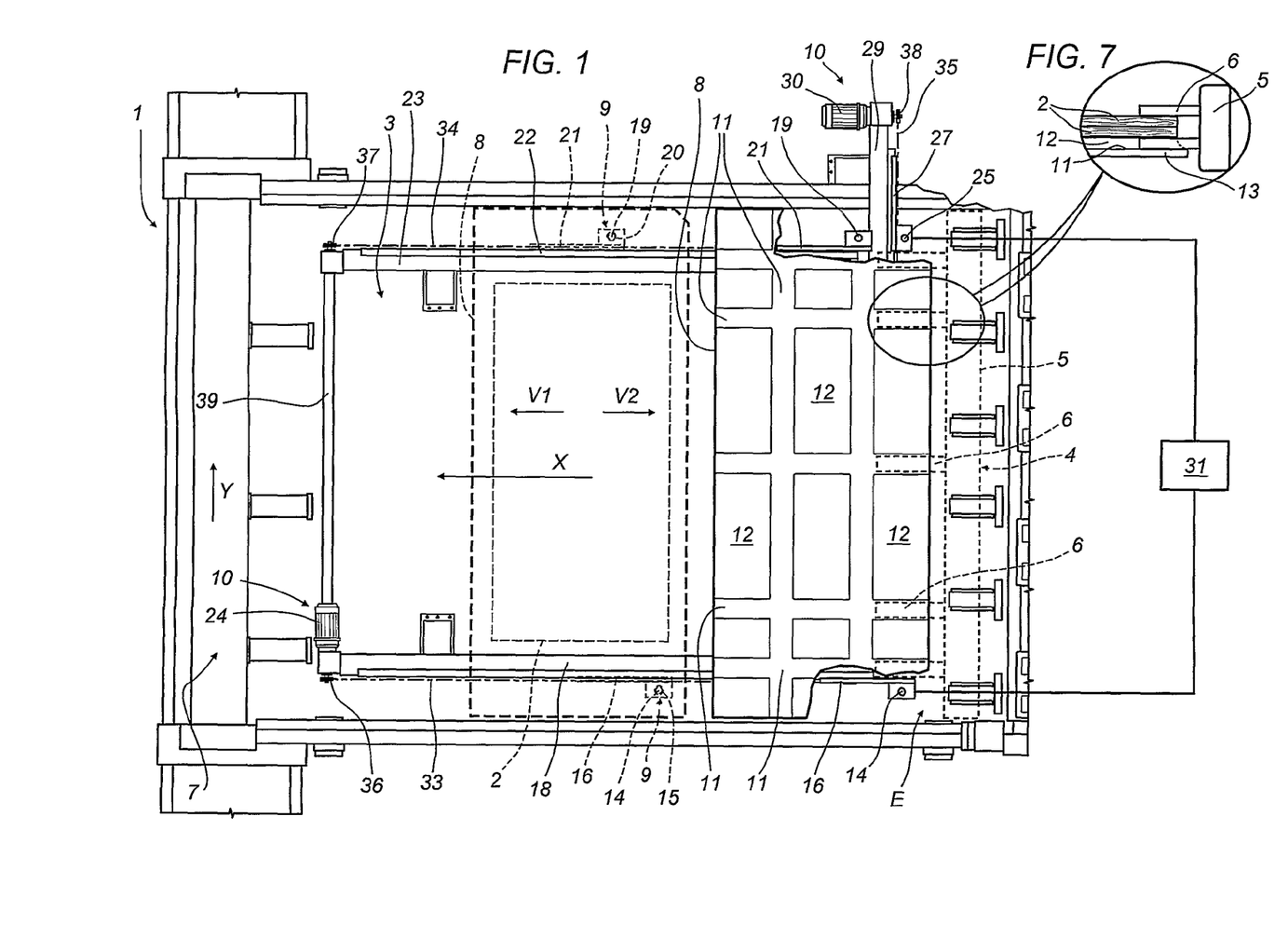
FIG. 1 is a schematic top plan view of a panel saw machine according to this invention, in a first operating configuration.
FIG. 7 shows a detail from FIG. 1 in a schematic side view with some parts cut away.
Figure 2:
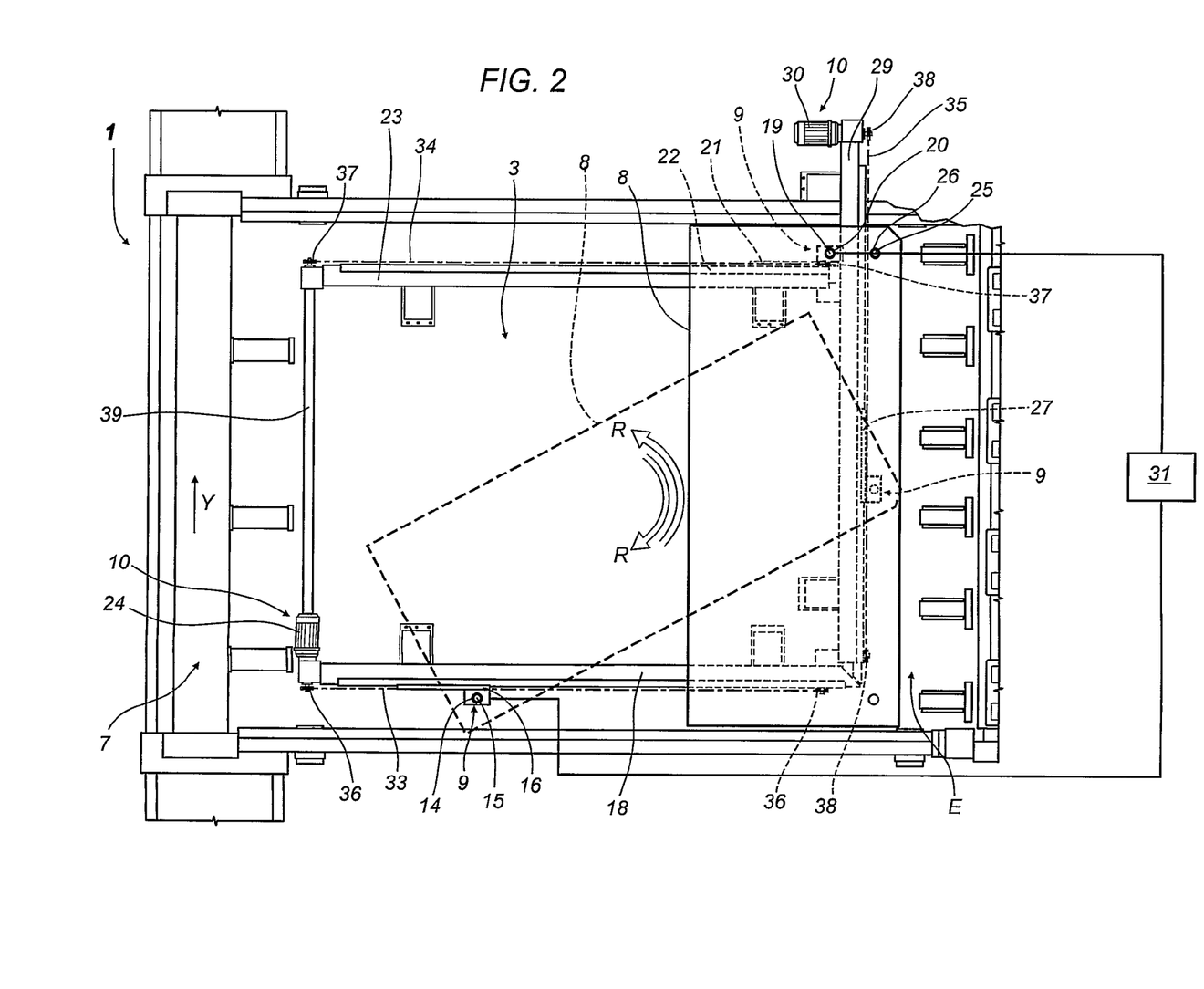
FIG. 2 is a schematic top plan view of the panel saw machine of FIG. 1, in a partial second operating configuration.

With reference to the accompanying drawings, especially FIGS. 1 and 2, the machine according to the invention, labelled 1 in its entirety, is used for cutting or sawing, both crossways and lengthways, a single panel 2 or two or more panels 2 of different sizes, made of wood or similar materials, usually placed one over the other in normally large stacks whose dimensions depend on the size of the panels made by the basic panel forming machines (not illustrated).

The panel saw machine 1, in its minimum configuration described herein for the sake of simplicity and purely by way of example, comprises:

a horizontal work table 3 for the panels 2 mobile on the horizontal work table 3 at least along an axis of feed (indicated by the arrow X) in a forward direction V1 and in a backward direction V2 towards and away from a panel 2 infeed area E;

a panel 2 clamping unit 4 comprising a crossbar 5 equipped with one or more gripping elements 6 (jaw type grippers of known type) for clamping and retaining the panels 2 at least while the panels 2 are being machined;

a cutting unit 7 (equipped with customary circular saws and scoring blades) positioned at the end of the horizontal work table 3 opposite the infeed area E and designed to divide the panels 2 into sub-panels by sawing the panels 2 along an axis Y transversal to the feed axis X.

In addition to these basic parts, the machine 1 further comprises:

a horizontal flat element or tray 8 positioned above the horizontal work table 3, for supporting and transporting the panels 2; and means 9 for selectively holding the tray 8 in conjunction with means 10 for driving the tray 8 itself, acting on the latter and enabling the tray 8 to perform a first movement along the feed axis X in both directions V1, V2 (see FIG. 1) and, when required, a rotational movement R on the horizontal work table 3 (see FIG. 2) in such a way as to vary the position of the tray 8 and, consequently, of the panels 2, with respect to the cutting unit 7.

Figure 5:
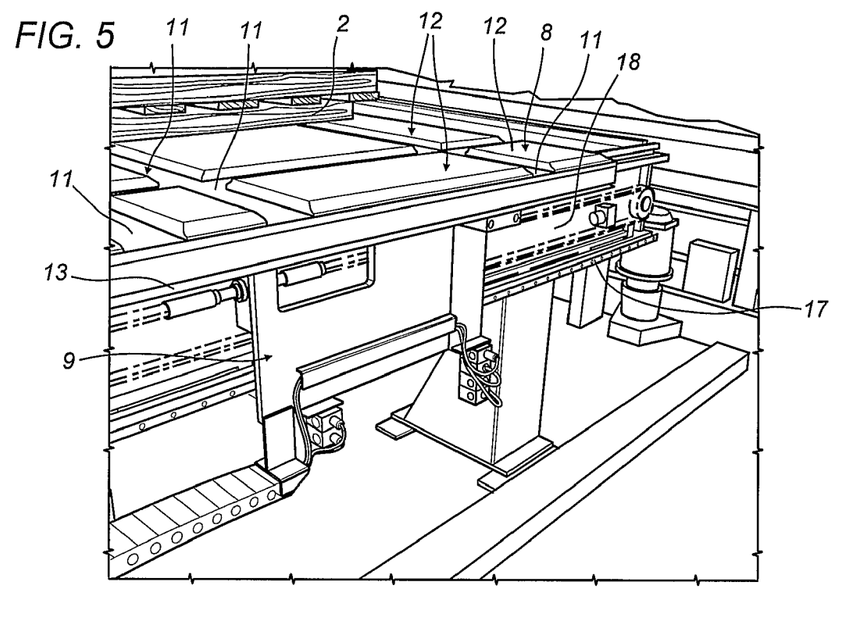
FIG. 5 is a perspective view, with some parts cut away in order to better illustrate others, of a third detail, that is to say, the first carriage equipped with a fixed pin coupled with a tray, of the panel saw machine of FIGS. 1 and 2.

As also shown in FIG. 5, the top supporting surface of the tray 8 defines at least one access channel 11 for each side of the tray 8 (being, for example, quadrangular in shape and at least equal in size to the maximum dimension of the panels 2 to be cut).

The channel 11 can be engaged by a part of the gripping element 6 when the panels 2 are rested on the tray 8 and when the panels 2 slide along the tray 8 during machining operations.

More specifically, the retaining unit 4 usually comprises a plurality of gripping elements 6 along the crossbar 5 and, therefore, the top supporting surface of the tray 8 defines a plurality of access channels 11 for each side of the tray 8, which can be engaged by a part of the gripping elements 6 (in practice, the lower jaw of the gripper—see FIG. 7) when the panels 2 are rested on the tray 8 and when the panels 2 slide along the tray 8 during machining operations.

FIGS. 1, 2 and 5 also show how the top surface of the tray 8 is made up of a plurality of rigid cushions 12 placed side by side and one after the other at regular intervals to form a panel 2 supporting surface that is raised with respect to the base 13 of the tray 8. This grid-like pattern of the base 13 defines a plurality of channels 11 that intersect each other on the base 13 of the tray 8 in such a way as to allow the gripping elements 6 various possibilities of moving towards each other and overlapping on the base 13 during the steps of resting and gripping the panels 2 before, during and after the cutting processes.

Figure 3:
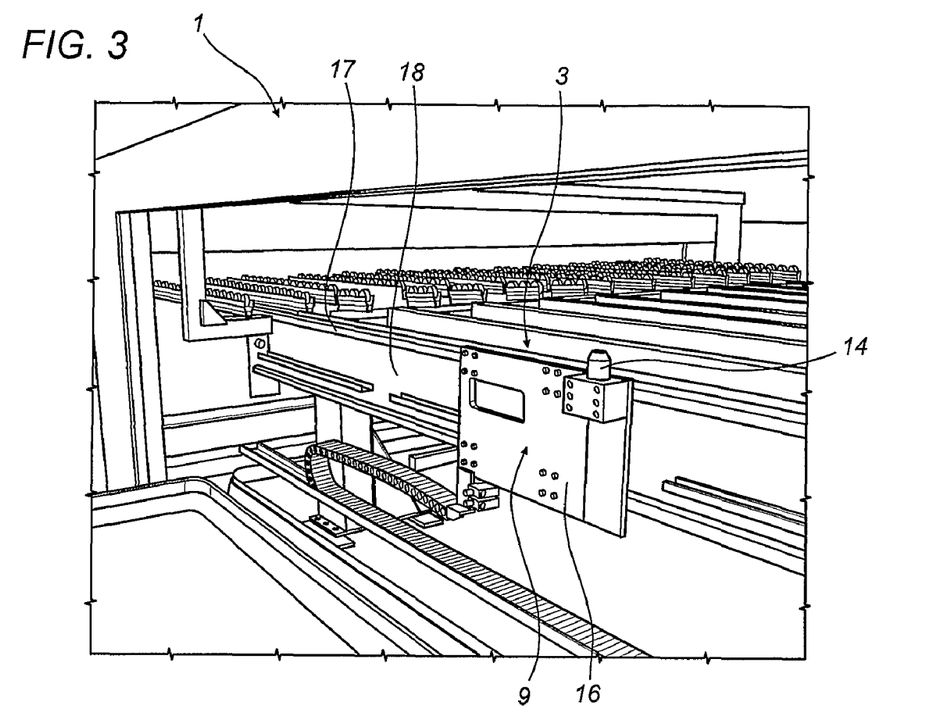
FIG. 3 is a perspective view, with some parts cut away in order to better illustrate others, showing a first detail, that is to say, a first carriage equipped with a fixed pin, of the panel saw machine illustrated in the drawings listed above.
Figure 4:
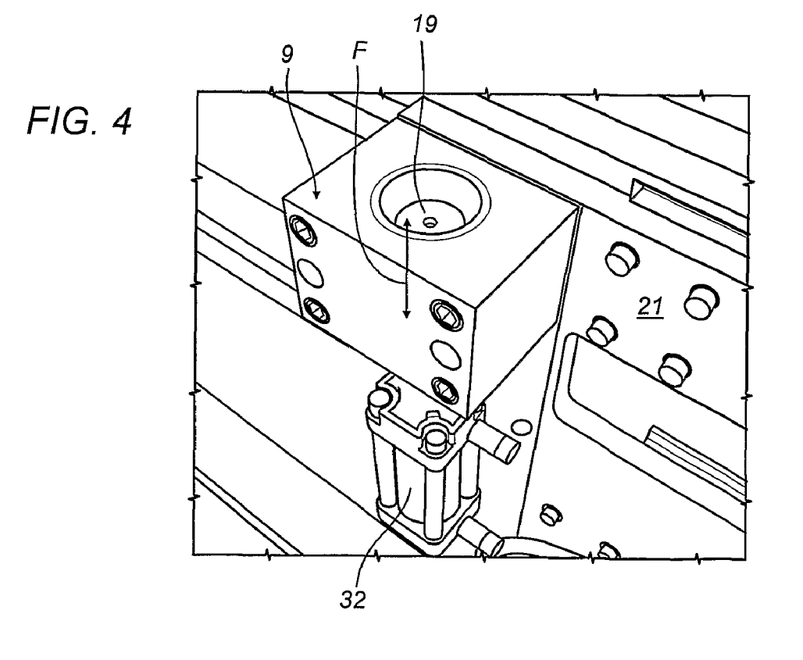
FIG. 4 is a perspective view from above, with some parts cut away in order to better illustrate others, of a second detail, that is to say, a second carriage equipped with a mobile pin, of the panel saw machine of FIGS. 1 and 2.
Figure 6:
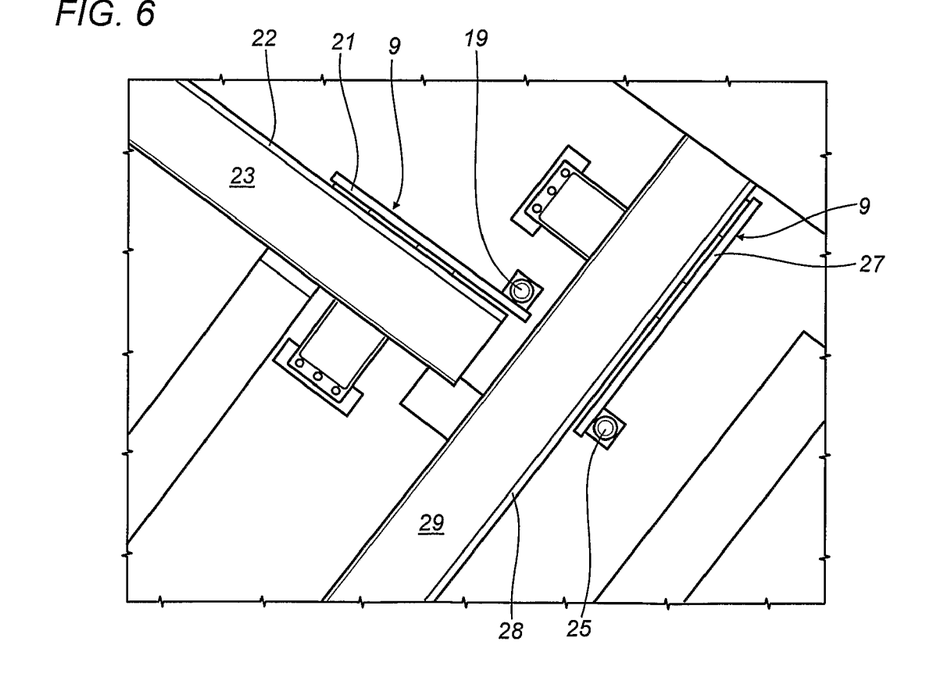
FIG. 6 is a plan view from above, with some parts cut away in order to better illustrate others, of a fourth detail, that is to say, a second and a third carriage equipped with mobile pins, of the panel saw machine of FIGS. 1 and 2.

As shown also in FIGS. 3, 4 and 6, the selective holding means 9 comprise:

a first, vertical fixed pin 14 that engages a first respective hole 15 made in the tray 8; the first pin 14 is associated with a first carriage 16 positioned under the tray 8 and slidably associated with rails 17 made on a first, fixed frame 18 extending in a direction parallel to the feed axis X along one side of the horizontal work table 3;

a second, vertical pin 19 that moves vertically (see arrow F in FIG. 4) and that, when required, engages a second respective through hole 20 made in the tray 8 on the side opposite the first hole 15; the second pin 19 is associated with a second carriage 21 positioned under the tray 8 and slidably associated with respective rails 22 made on a second, fixed frame 23 extending in a direction parallel to the feed axis X along one side of the horizontal work table 3;

a first motor 24, forming a part of the above mentioned drive means and kinematically connected to the first and second carriages 16 and 21 in such a way as to permit the above mentioned first coordinated movement of the tray 8 along the feed axis X (see FIG. 1);

a third, vertical pin 25 (see also FIG. 6) that moves vertically and that, when required, engages a third respective hole 26 made in the tray 8 on the side opposite the first hole 15; the third pin 25 is in turn associated with a third carriage 27 positioned under the tray 8 and slidably associated with respective rails 28 made on a third, fixed frame 29 extending in a direction perpendicular to the feed axis X; the third frame 29 is positioned in the vicinity of the end of the horizontal work table 3 close to the area E where the panels 2 are fed onto the horizontal work table 3;

a second motor 30 forming the other part of the drive means and kinematically connected to the third carriage 27 in such a way as to permit, in conjunction with the first carriage 16 with the fixed pin 14, the above mentioned second coordinated rotational movement R of the tray 8 in both directions on the horizontal work table 3.

In addition to these parts, there is also a control unit 31 (usually a customary machine control unit, illustrated as a block) acting on the second and third pins 19 and 25 when the tray 8 is positioned close to the infeed area E, and designed to raise one of the two pins, that is, either the second or the third pin 19 or 25, and simultaneously lowering the other of the two pins 19 or 25, depending on the movement to be performed by the tray 8 and so that one of the two pins 19 or 25, is inside the respective second or third hole 20 or 26 at all times.

At a structural level (again with reference to FIGS. 3 to 6), the second and third carriages 21 and 27 are each equipped with a respective actuator 32 for driving the respective second or third pin 19 or 25, said actuator 32 is controlled by the control unit 31 in such a way as to enable the coordinated lifting and lowering movements of the pins 19 and 25.

Each of the three carriages 16, 21 and 27 may consist of a plate each for supporting the pins 14, 19 and 25 and slidably connected to the respective rails 17, 22 and 28.

Each plate 16, 21 and 27 may be associated with an endless chain 33, 34, 35 trained around respective pairs of power driven sprockets 36, 37 38 and designed to drive the carriages 16, 21, 27 (in both directions) along the rails 17, 22, 28.

As shown in FIGS. 1 and 2, the first and second parallel carriages 16 and 21 are driven by a single motor 24 kinematically connected directly to one of the sprockets 36 of the chain 33 of the first carriage 16 and indirectly to one of the sprockets 37 of the chain 34 of the second carriage 21 through transmission means 39 such as, for example, a torsion bar.

In short, a panel saw machine 1 such as the one described above works as follows, starting from an operating condition as shown in FIG. 1, that is, with the tray 8 positioned in the vicinity of the infeed area E and with the first and second pins 14 and 19 engaging the tray 8.

The grippers 6 running in the channels 11 of the tray 8 cause the group of panels 2 to slide onto and rest on the tray 8.

At this point, the first motor 24 is started and drives the first and second carriages 16 and 21 in such a way as to move the tray 8 with the panels 2 on it along the feed axis X close to the cutting unit 7, while the crossbar 5 with the grippers 6 follows the tray 8.

Once positioned, the panels 2 are cut according to the machine program and when cutting has been completed, the tray 8 may, if necessary, be moved back to the infeed area E to pick up a new load or to vary the position of the panels 2 by turning the tray 8.

This operation is performed by activating the actuators 32, controlled by the unit 31, in order to lower the second pin 19 and raise the third pin 25 in coordinated fashion in such a way as to respectively disengage and engage the second and third holes 20 and 26 and keep one of the two pins 19 and 25 engaged with the tray 8 in conjunction with the first pin 14 at all times.

When this step is over, the first motor 24, for example, initially starts and drives the tray 8 by means of the first carriage 16, while the third carriage 27 remains idle and is simply pushed by the first carriage 16 (see FIG. 2). When the tray 8 reaches a certain angle on the work table 3, the unit 31 starts the second motor 30 and may start the first motor 24 to enable the tray 8 to be pushed by the third carriage 27 while the first carriage 16 is simply dragged, until the tray 8 reaches the required position.

Next, the grippers 6 are made to move back onto the rotated tray 8 so that the panels 2 can be moved towards the cutting unit 7 and machined.

When cutting operations are over, the tray 8 can be moved back to the previous configuration by reversing the above sequence of motor and carriage drive steps.

The above operating cycle is described purely by way of example. Obviously, the various stages in the initial and subsequent positioning of the tray 8 will depend on the programming of the unit 31.

Similarly, the machine is described with reference to its simplest configuration but it is obvious that the solution provided can be applied, without departing from the scope of the invention, to more complex machines, with two or more successive cutting lines.

A machine made as described above achieves the aforementioned aims thanks to the provision of an interface element, that is to say, the tray, with which the panels can be positioned quickly and extremely accurately.

The basic structure of the machine is not significantly altered and the tray drive components offer considerable economic advantages, in terms also of stacked panel handling safety. Thanks to the tray, the panels are kept in a properly stacked condition at all times.

The invention described has evident industrial applications and can be modified an adapted in many ways without thereby departing from the scope of the inventive concept. Moreover, all details of the invention may be substituted by technically equivalent elements.

The invention claimed is:

1. A panel saw machine comprising:
   a horizontal work table (3) for movably supporting panels (2) for movement at least along an axis of feed (X) in a forward direction (V1) and in a backward direction (V2);
   a clamping unit (4) comprising a crossbar (5) equipped with one or more gripping elements (6) for clamping and retaining at least one panel (2) at least while the panel (2) is being cut;
   a cutting unit (7) that divides the at least one panel (2) into sub-panels by sawing the panel (2) along an axis (Y) that is substantially transverse to the feed axis (X);
   a horizontal tray (8) supported on and movable relative to the horizontal work table (3), said tray supporting and transporting the at least one panel (2);
   holding means (9) for selectively holding the tray (8), said holding means comprising at least three carriages, each of said carriages being located adjacent the work table and movable relative to the work table;
   driving means (10) for selectively driving the holding means relative to the work table;
   said holding means and said driving means selectively acting together to perform a first movement of the tray relative to the work table along the feed axis (X) in the forward and backward directions (V1, V2) and to perform a rotational movement (R) of the tray (8) relative to the work table (3) in such a way as to vary the position of the tray (8) and, consequently, of the at least one panel (2), with respect to the cutting unit (7),
   wherein a first plurality of said carriages of said holding means selectively engage the tray in a first holding configuration and said driving means selectively act on and move the first plurality of carriages relative to the work table in order to move the tray in the forward and backward directions relative to the work table; and,
   wherein a second plurality of said carriages of said holding means engage the tray in a second holding configuration that is different from said first holding configuration and said driving means selectively act on and move the second plurality of carriages relative to the work table to rotate the tray relative to the work table.

2. The machine according to claim 1, wherein the top supporting surface of the tray (8) defines at least one access channel (11) for each side of the tray (8), engageable by a part of the gripping element (6) when the at least one panel (2) is rested on the tray (8) and when the at least one panel (2) slides along the tray (8) during panel sawing operations.

3. The machine according to claim 1, where the clamping unit (4) comprises a plurality of gripping elements (6) mounted on the crossbar (5), wherein the top supporting surface of the tray (8) defines a plurality of access channels (11) for each side of the tray (8), engageable by a part of the gripping elements (6) when the at least one panel (2) is rested on the tray (8) and when the at least one panel (2) slides along the tray (8) during panel sawing operations.

4. The machine according to claim 3, wherein said top supporting surface is made up of a plurality of rigid cushions (12) placed side by side and one after the other at regular intervals to form said top supporting surface for supporting the at least one panel (2) and that is raised with respect to the base (13) of the tray (8).

5. The machine according to claim 1, wherein the selective holding means (9) comprise at least:
   a first, vertical fixed pin (14) that engages a first respective hole (15) made in the tray (8); the first pin (14) being associated with a first carriage (16) positioned under the tray (8) and slidably associated with rails (17) made on a first, fixed frame (18) extending in a direction parallel to the feed axis (X) along one side of the horizontal work table (3);
   a second, vertical pin (19) that moves vertically and that, when required, engages a second respective through hole (20) made in the tray (8) on the side opposite the first hole (15); the second pin (19) being associated with a second carriage (21) positioned under the tray (8) and slidably associated with respective rails (22) made on a second, fixed frame (23) extending in a direction parallel to the feed axis (X) along one side of the horizontal work table (3);
   a first motor (24), forming a part of the drive means and kinematically connected to the first carriage (16) and second carriage (21) in such a way as to permit the first coordinated movement of the tray (8) along the feed axis (X);
   wherein the first plurality of carriages comprises said first and second carriages.

6. The machine according to claim 5, wherein the selective holding means (9) further comprise:
   a third, vertical pin (25) that moves vertically and that, when required, engages a third respective hole (26) made in the tray (8) on the side opposite the first hole (15); the third pin (25) being in turn associated with a third carriage (27) positioned under the tray (8) and slidably associated with respective rails (28) made on a third, fixed frame (29) extending in a direction perpendicular to the feed axis (X) and being positioned in the vicinity of the end of the horizontal work table (3) opposite the end where the cutting unit (7) is located;
   a second motor (30) forming the other part of the drive means and kinematically connected to the third carriage (27) in such a way as to permit, in conjunction with the first carriage (16) with the fixed pin (14) the second coordinated rotational movement (R) of the tray (8) on the horizontal work table (3);
   a control unit (31) acting on the second pin (19) and third pin (25) when the tray (8) is positioned close to the end of the horizontal work table (3) opposite the cutting unit (7) and designed to raise one of the two pins, that is, either the second pin (19) or the third pin (25), and simultaneously lowering the other of the two pins, that is either the second pin (19) or the third pin (25), depending on the movement to be performed and so that one of the two pins (19, 25), is inside the respective second or third hole (20, 26) at all times;
   wherein said second plurality of carriages comprises one of said first and second carriages and said third carriage.

7. The machine according to claim 1, wherein the selective holding means (9) comprise:
   a first, vertical fixed pin (14) that engages a first respective hole (15) made in the tray (8); the first pin (14) being associated with a first carriage (16) positioned under the tray (8) and slidably associated with rails (17) made on a first, fixed frame (18) extending in a direction parallel to the feed axis (X) along one side of the horizontal work table (3);
   a second, vertical pin (19) that moves vertically and that, when required, engages a second respective through hole (20) made in the tray (8) on the side opposite the first hole (15); the second pin (19) being associated with a second carriage (21) positioned under the tray (8) and slidably associated with respective rails (22) made on a second, fixed frame (23) extending in a direction parallel to the feed axis (X) along one side of the horizontal work table (3);
   a first motor (24), forming a part of the drive means and kinematically connected to the first carriage (16) and second carriage (21) in such a way as to permit the first coordinated movement of the tray (8) along the feed axis (X);
   a third, vertical pin (25) that moves vertically and that, when required, engages a third respective hole (26) made in the tray (8) on the side opposite the first hole (15); the third pin (25) being in turn associated with a third carriage (27) positioned under the tray (8) and slidably associated with respective rails (28) made on a third, fixed frame (29) extending in a direction perpendicular to the feed axis (X) and being positioned in the vicinity of the end of the horizontal work table (3) opposite the end where the cutting unit (7) is located;
   a second motor (30) forming the other part of the drive means and kinematically connected to the third carriage (27) in such a way as to permit, in conjunction with the first carriage (16) with the fixed pin (14) the second coordinated rotational movement (R) of the tray (8) on the horizontal work table (3);
   a control unit (31) acting on the second pin (19) and third pin (25) when the tray (8) is positioned close to the end of the horizontal work table (3) opposite the cutting unit (7) and designed to raise one of the two pins, that is, either the second pin (19) or the third pin (25), and simultaneously lowering the other of the two pins, that is either the second pin (19) or the third pin (25), depending on the movement to be performed and so that one of the two pins (19, 25), is inside the respective second or third hole (20, 26) at all times;
   wherein the first plurality of carriages comprises said first and second carriages; and,
   wherein said second plurality of carriages comprises one of said first and second carriages and said third carriage.

8. The machine according to claim 7, wherein the second carriage (21) and the third carriage (27) are each equipped with a respective actuator (32) for driving the respective second pin (19) or third pin (25) and being controlled by the control unit (31) in such a way as to enable the coordinated lifting and lowering movements of the pins (19, 25).

9. The machine according to claim 7, wherein the first carriage (16), the second carriage (21) and the third carriage (27) each comprise a plate for supporting the pins (14, 19, 25) and slidably connected to the respective rails (17, 22, 28); each plate (16, 21, 27) being associated with an endless chain (33, 34, 35) trained around respective pairs of power driven sprockets (36, 37, 38) and designed to drive the carriages (16, 21, 27) along the rails (17, 22, 28).

10. The machine according to claim 9, wherein the first carriage (16) and the second carriage (21) are driven by a single motor (24) kinematically connected directly to one of the sprockets (36) of the chain (33) of the first carriage (16) and indirectly to one of the sprockets (37) of the chain (34) of the second carriage (21) through transmission means (39).

* * * * *